United States Patent
Lachnitt (10) Patent No.: US 9,143,587 B2
(45) Date of Patent: Sep. 22, 2015

(54) CELLULAR TELEPHONE INTEGRATION SYSTEM

(71) Applicant: Peiker acustic GmbH & Co. KG, Friedrichsdorf (DE)

(72) Inventor: Jens Lachnitt, Alsfeld (DE)

(73) Assignee: Peiker Acustic GmbH & Co. KG, Friedrichsdorf (DE)

(*) Notice: Subject to any disclaimer, the term of this patent is extended or adjusted under 35 U.S.C. 154(b) by 228 days.

(21) Appl. No.: 13/903,300

(22) Filed: May 28, 2013

(65) Prior Publication Data

US 2013/0324198 A1    Dec. 5, 2013

(30) Foreign Application Priority Data

May 30, 2012   (DE) .......................... 10 2012 010 600
Oct. 22, 2012   (DE) .......................... 10 2012 020 577
Mar. 15, 2013   (DE) .......................... 10 2013 004 442

(51) Int. Cl.

| H04M 1/00 | (2006.01) |
| H04M 1/02 | (2006.01) |
| B60R 11/02 | (2006.01) |
| H04B 1/3822 | (2015.01) |
| B60R 11/00 | (2006.01) |

(52) U.S. Cl.
CPC .......... *H04M 1/0202* (2013.01); *B60R 11/0241* (2013.01); *H04B 1/3822* (2013.01); *B60R 2011/0071* (2013.01)

(58) Field of Classification Search
CPC .................. A45F 2200/0508; A45C 2011/001
See application file for complete search history.

(56) References Cited

U.S. PATENT DOCUMENTS

| 2002/0100782 A1* | 8/2002 | Marvin .......................... 224/483 |
| 2006/0180726 A1* | 8/2006 | Mollinari .................... 248/316.1 |
| 2007/0045495 A1* | 3/2007 | Asano et al. ............... 248/309.1 |
| 2009/0273891 A1* | 11/2009 | Peiker ....................... 361/679.01 |
| 2011/0059781 A1* | 3/2011 | Sin .............................. 455/575.6 |
| 2011/0132950 A1 | 6/2011 | Culver |
| 2012/0104195 A1 | 5/2012 | Da Costa Pito et al. |

(Continued)

FOREIGN PATENT DOCUMENTS

| DE | 20 2011 106 185 U1 | 12/2011 |
| DE | 10 2011 054 346 B3 | 4/2013 |

(Continued)

OTHER PUBLICATIONS

European Search Report (Application No. 13002026.6) dated Oct. 7, 2013.

*Primary Examiner* — Edward Urban
*Assistant Examiner* — Mohammed Rachedine
(74) *Attorney, Agent, or Firm* — Burr & Brown, PLLC (57) ABSTRACT

The invention relates to a cellular telephone integration system, comprising an adapter and a mounting device, whereby the adapter incorporates a base body with a seating, whereby the adapter incorporates at least one interface with the cellular telephone. Here, the adapter incorporates a clip, which projects over the seating, in the direction of the seating from one edge of the base body in a clamping position under pretension such that a cellular telephone can be inserted between a free end of the clip and the seating in a clamping position, whereby the cellular telephone in the clamping position between the clip and the seating is secured by the clip pressing on the cellular telephone such that this is held firmly in position in the clamping position, even while the vehicle is in operation.

12 Claims, 11 Drawing Sheets

(56) References Cited

U.S. PATENT DOCUMENTS

2013/0148273 A1* 6/2013 Tsai ........................ 361/679.01
2014/0295758 A1* 10/2014 Pedersen ...................... 455/41.2

FOREIGN PATENT DOCUMENTS

| EP | 200 10 532 U1 | 11/2000 |
|---|---|---|
| EP | 200 11 311 u1 | 11/2000 |
| EP | 2 125 434 B1 | 8/2010 |
| WO | 2004/039628 A1 | 5/2004 |
| WO | 2008/097032 A1 | 8/2008 |

* cited by examiner

CELLULAR TELEPHONE INTEGRATION SYSTEM

CROSS REFERENCE TO RELATED APPLICATIONS

This application claims the benefit under 35 USC §119(a)-(d) of German Application No. 10 2012 010 600.9 filed May 30, 2012, 10 2012 020 577.5 filed Oct. 22, 2012, and 10 2013 004 442.1 filed Mar. 15, 2013, the entireties of which are incorporated herein by reference.

BACKGROUND OF THE INVENTION

1. Field of the Invention

The invention relates to a cellular telephone integration system.

2. Description of Related Art

A cellular telephone integration system comprising an adapter and a mounting device is known from EP 2 125 434 B1, whereby the adapter comprises a seating, whereby a cellular telephone can be placed on the seating, whereby the mounting device is affixed to a vehicle, whereby the adapter is detachably clamped to the mounting device and comprises a base body, whereby the adapter incorporates at least one interface with the cellular telephone. Here, such adapters designed as a cradle are specifically customized for various cellular telephones.

SUMMARY OF THE INVENTION

The object underlying the present invention is the development of a cellular telephone integration system to hold a variety of different cellular telephones reliably using a single adapter.

In the cellular telephone integration system according to the invention, the adapter incorporates a clip, which projects over the seating, in the direction of the seating, from one edge of the base body in a clamping position under pretension such that a cellular telephone can be inserted between a free end of the clip and the seating in a clamping position, whereby the cellular telephone in the clamping position between the clip and the seating is secured by the clip pressing on the cellular telephone such that this is held firmly in position in the clamping position, even while the vehicle is in operation. In contrast to conventional cellular telephone integration systems, by using such an adapter, the cellular telephone is not generally held by the narrow sides or side panels located between the display and the rear side, but is held by pressure exerted on the display, with its rear side opposite the display, pressed onto the seating of the adapter, and hence is secured to the adapter. The core of the present invention is to dispense with the necessity of access to the narrow sides or side panels of the cellular telephone by utilizing a holding force acting on the display and, in this way, to make the cellular telephone integration system independent of the length and breadth measurements of the cellular telephone and, by this means, to be able to secure a variety of different cellular telephones in the vehicle with one and the same adapter. A further core of the present invention is to provide a cellular telephone integration system which must essentially only present one tolerance in terms of measuring the thickness of the cellular telephone for securing the individual cellular telephone, in order to take advantage of the fact that most modern cellular telephones have a narrow tolerance range, in particular, in a range of approximately 0.5 cm to approximately 2 cm.

The present invention also allows the free end of the clip to be projected into a central section of the seating, whereby the clip is in contact with the cellular telephone resting on the seating, in particular, at a point or along a line or over an area. By constructing the clip in this fashion, it is also possible to dimension the clip such that it can be operated by the user. In addition, using such a construction, access to a receiving compartment positioned above the seating is also created, such that the cellular telephone can be inserted under the clip from the outside.

In addition, the present invention enables a first interface of the adapter to be designed as a charger interface, whereby the charger interface is designed as a wireless charger interface, via which electric energy from an inductive loading unit of the adapter can be transmitted wirelessly to a receiver coil of the cellular telephone or whereby the charger interface is designed as a wire-connected charger interface, which incorporates a charger lead equipped with a connector, which is led out of the adapter such that different connector positions can be reached using the connector. Using such a design for the charger interface, a power supply is insured for the cellular telephone such that it can be operated in the vehicle, even over longer periods.

The present invention also enables a second interface of the adapter to be designed as an antenna connection interface, via which antenna signals from a coupler antenna of the adapter can be received from the cellular telephone and can be transmitted to the cellular telephone. Here, the present invention enables this second interface to be one of a wire-connected and wireless connection interface. Using such a second interface, the cellular telephone integration system is also suitable for vehicles with insulated windows, where an external antenna must necessarily be used to be able to send and receive an adequate quality signal.

According to some of the embodiments of the present invention, the clip can either be arranged rotationally fixed on the base body with the pretension of the clip generated by an elastic deformation of the clip by the inserted cellular telephone or the clip can be arrange to be pivotable around an axis of rotation on the base body, whereby the adapter incorporates a clamping device, which is arranged between the base body of the adapter and the clip, and generates the pretension. Both adapter configurations enable the required pressure to be exerted on the cellular telephone by simple means.

In some embodiments of the present invention, the clip is pivotable around its axis of rotation from the clamping position to a release position. In so doing, inserting and removing, particularly larger cellular telephones, is made easier. In addition, in some of these embodiments the clip can be rotated still further around the axis of rotation by overriding the force holding the clip in the release position in the opening direction. In so doing, overloading the clip by an unintentional strain or exertion of the clip in the release position against the direction of closing is effectively avoided since the clip is able to accommodate or give way without being damaged.

In some embodiments, the adapter is equipped with a damping device, which acts as a braking device, whereby if the clip moves from the release position into the clamping position against the clamping force of the clamping device, the damping device acts such that the speed of the movement of the clip towards the clamping position is reduced. In so doing, the clip is effectively prevented from striking the cellular telephone when the clip is pivoted into the closed position.

Some embodiments of the present invention also enable a second wire-connected connection interface to be formed on the adapter, which incorporates an antenna cable equipped with a connector, which, in particular, is led out of the adapter such that different connector positions can be reached using the connector. By this means, an antenna connection can also be created cost effectively, if the cellular telephone used has an antenna connection.

Moreover, in some embodiments of the present invention, the base body is designed using a flexible elastic pad, which forms at least part of the seating. By this means, the cellular telephone can be protected from vibrations from the vehicle, as well as being cushioned against pressure exerted by the clip.

The present invention also enables the axis of rotation of the clip to be aligned with one of the direction of travel of the vehicle and an approximation of the direction of travel, that is, with a deviation of a maximum of 30° to the direction of travel of the vehicle, such that the cellular telephone being inserted in the receiving compartment is drawn in the direction of the axis of rotation of the clip by gravitational force. By this means, the holding force with which the clip on the cellular telephone must operate can be kept low since it only has to prevent the cellular telephone from slipping. The load resulting from gravity, however, is essentially absorbed by the immovable parts of the adapter.

In accordance with one embodiment, the present invention enables the adapter to be designed with a third interface, which incorporates a wireless data communication device, whereby a wireless data communication connection is provided to a cellular telephone located in the vehicle and, in particular, the adapter is provided with a connection via the data communication device to the electronics of the vehicle for additional data communication. By this means, the cellular telephone can be connected to the vehicle and this, for example, can be operated via an interface arranged in the vehicle and/or data saved in the cellular telephone can be depicted on the vehicle display.

Wire-connected or wireless data communication is provided for the data communication between the data communication device and the electronics of the vehicle, whereby a wire-connected data communication connection is formed, in particular, via a cable connection in accordance with the USB standard or whereby a wireless data communication connection is formed, in particular, via a radio link. By this means, the technical requirements of differently designed vehicles can be met by the present invention.

Finally, some embodiments of the present invention enable the wireless data communication connection to be operated in accordance with either the so-called WIFI standard or the IEEE 802.11 standard. High data transfer rates can be achieved by this means and encrypted data communication is possible.

A complete wireless connection of the cellular telephone to the adapter in terms of antenna signal, energy supply and two-way transfer of data and commands makes a mechanical design of the adapter possible, which is suitable for a large number of cellular telephones with different housing designs and/or different connection ports since the adapter does not have to provide a connector for the electrical contact of the cellular telephone inserted.

For the purposes of the invention, a charger lead is understood to mean any cable which is suitable for supplying the cellular telephone with power, whereby the charger lead also incorporates data lines and/or control lines in one design variant.

BRIEF DESCRIPTION OF THE DRAWINGS

Further details of the invention will be described in the drawings by reference to schematically represented embodiments.

DETAILED DESCRIPTION OF THE INVENTION

Figure 1:
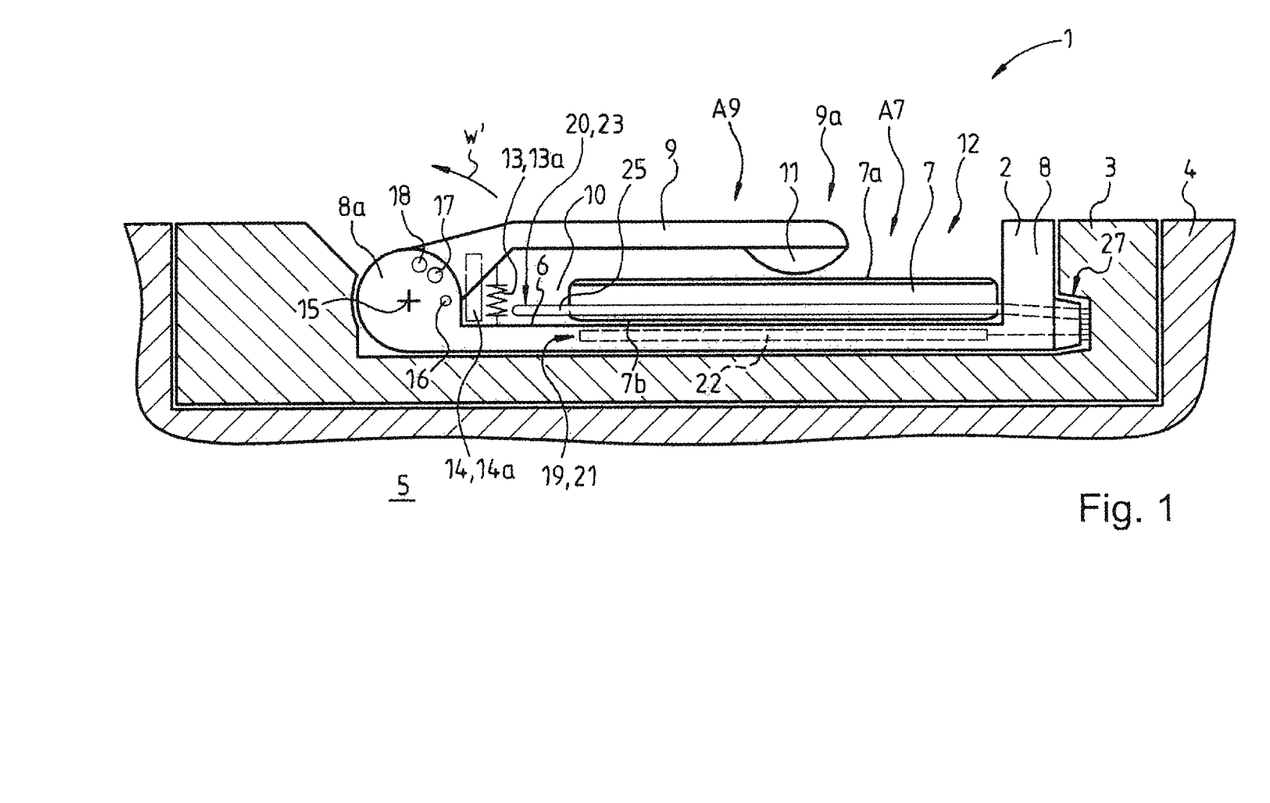
FIG. 1 is a partially cutaway side view of a first embodiment of a cellular telephone integration system according to the invention, in which a clip is in a clamping position.

In FIG. 1, a partially cutaway side view of a first embodiment of a cellular telephone integration system according to the cellular telephone integration system 1 is depicted. The cellular telephone integration system 1 comprises an adapter 2 and a mounting device 3, whereby the mounting device 3 is accommodated in a console 4 of a vehicle 5. The console 4 and the mounting device 3 are depicted as cutaway in order to be able to depict a side view of the adapter 2. The adapter 2 incorporates a seating 6, in which a cellular telephone 7 is placed. The cellular telephone 7 is depicted with its display 7a uppermost and with its rear side 7b, located opposite the display 7a, in contact with the seating 6. The adapter 2 is secured detachably to the mounting device 3 and can be detached from the mounting device 3. Thus, the adapter 2 incorporates a base body 8 and a clip 9, which projects over the seating 6, from one edge 8a of the base body 8 in the clamping position A9 depicted in FIG. 1, with a fixing element 11, under pretension in the direction of the seating 6, into a receiving compartment 10 for the cellular telephone 7. Here, the cellular telephone 7 can be inserted into the receiving compartment 10 between a free end 9a of the clip 9 and the seating 6 in the clamping position depicted A7 through an access 12. In this clamping position A7, in which the cellular telephone 7 is positioned with its rear side 7b on the seating 6 of the adapter 2, the cellular telephone 7 is secured between the clip 9 and the seating 6 by the clip 9 pressing on the display 7a of the cellular telephone 7 with the fixing element 11. This clip 9 holds the cellular telephone 7 firmly in position in the adapter 2 in the clamping position depicted A7, even while the vehicle 5 is in operation. The clip 9 is drawn into the clamping position A9 depicted in FIG. 1 by a clamping device 13 in the form of a spring 13a. In parallel with the clamping device 13, a damping device 14, designed as a compressible foam pad 14a, also has an affect on the clip 9. The clip 9 can be pivoted around an axis of rotation 15 hinged to the base body 8 and incorporates a stop 16, which, when the clip 9 is rotated out of the clamping position depicted A9, works against the force of the clamping device 13 together with stop recesses 17 and 18 formed on the base body 8 in a direction of rotation w', when a release position B9 depicted in FIG. 2 or an overload position C9 depicted in FIG. 3 is reached. The schematically represented components 13, 14 and 16 to 18 are only depicted in FIG. 2. In order to maintain clarity, these components are not depicted in FIG. 3. The console of the vehicle has also not been depicted in FIGS. 2 and 3. Unlike FIGS. 2 and 3, FIG. 1 also depicts a first interface 19, 20 in two different designs, which can be realized in the cellular telephone integration system according to the invention 1 alternately or cumulatively. Here, the first design variant of the first interface 19 is realized as a wireless charger interface 21. This charger interface 21 incorporates an inductive loading unit 22 built into the adapter 2, which features a receiver coil (not depicted) for a suitable cellular telephone. Here, the second design variant of the first interface 20 is designed as a wire-connected charger interface 23. As can also be seen in the plan view of FIG. 1 depicted in FIG. 4, this incorporates a connector 24 and a charger lead 25, whereby the connector 24 matches a socket 26 (not depicted in more detail) on the cellular telephone 7. Energy from the vehicle 5 is supplied via the mounting device 3, which is connected to the adapter 2 via an electrical plug connection 27.

Figure 2:
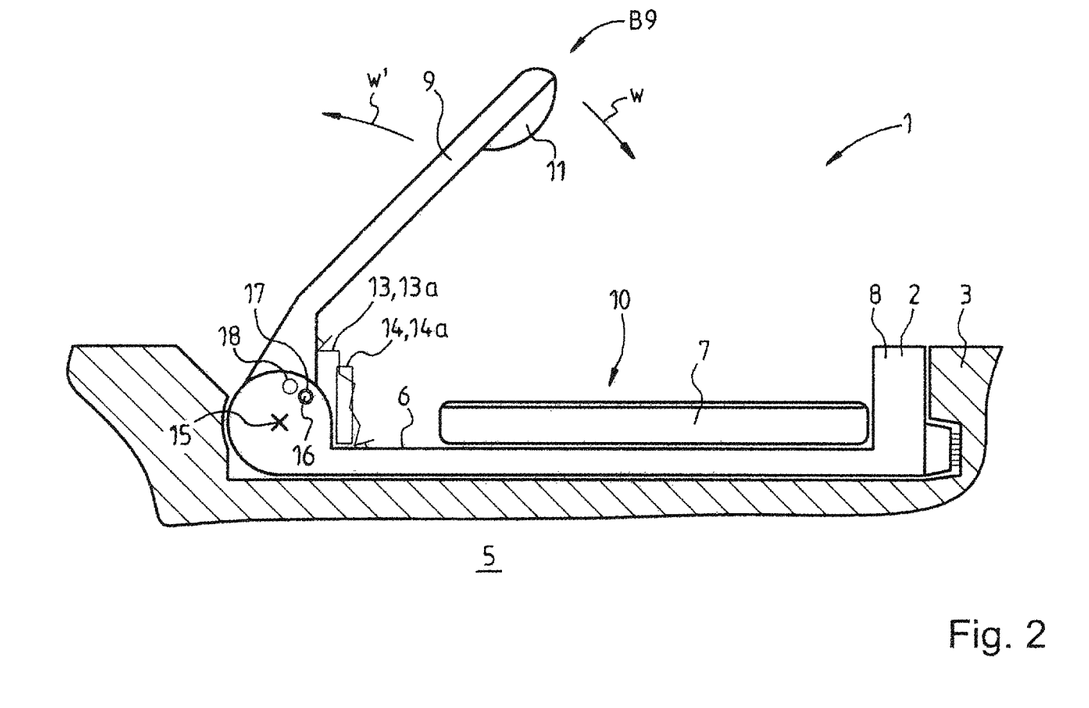
FIG. 2 is a second side view of the first embodiment, whereby the clip is in a release position.
Figure 3:
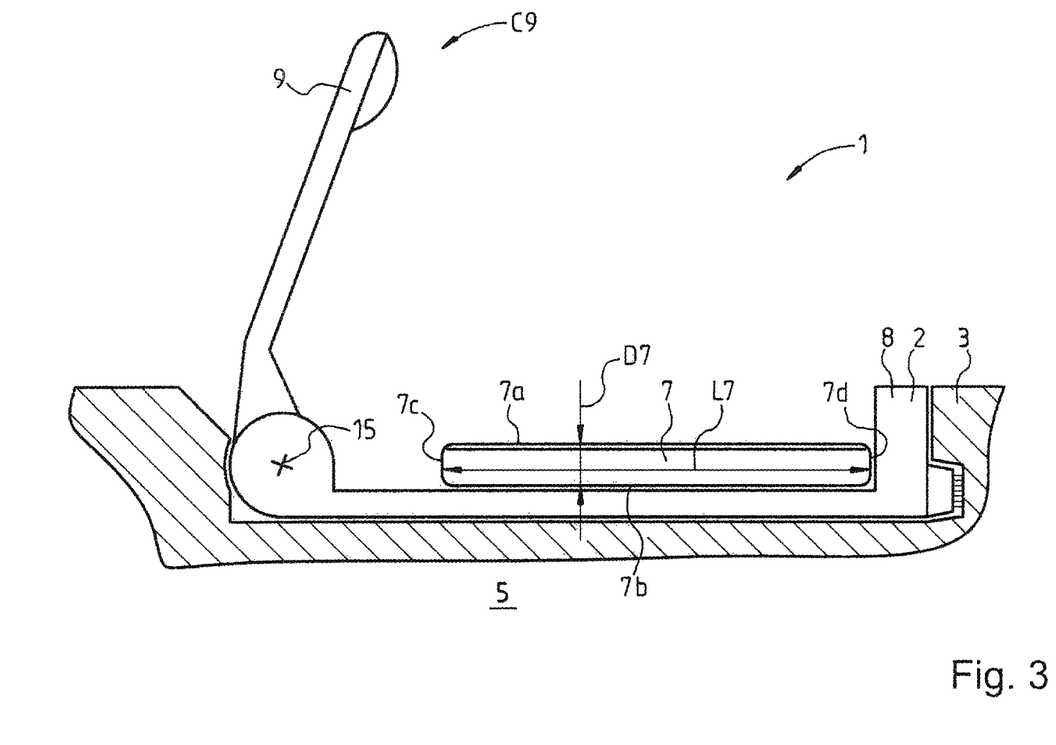
FIG. 3 is a third side view of the first embodiment, whereby the clip is in an overload position.

In FIG. 2, as mentioned above, a second side view of the first design variant of the cellular telephone integration system 1 is depicted, whereby the clip 9 is in the release position B9, in which the cellular telephone 7 can be easily removed from the receiving compartment 10 positioned above the seating 6 and conversely can also be easily inserted into the receiving compartment 10. The manner in which the stop 16 is accommodated in the stop recess 17 when the clip 9 is in the release position B9 can be seen in FIG. 2. From the release position B9, this clip 9 can now be pivoted around its axis of rotation 15 again to the clamping position A9 depicted in FIG. 1. Whereby, after manually overriding the holding force, to which the clip 9 is subject via the stop 16 on the base body 8, the clip 9 is pivoted in direction of rotation w around the axis of rotation 15 by the spring element 14. In order to prevent the clip 9 striking the display 7a of the cellular telephone 7 with its fixing element 11, the rotation speed of the clip 9 is reduced by the damping device 14 before the fixing element 11 strikes the display 7a with the clip 9, since the clamping device 13 must also create a force to override the opposing force of the damping element 14.

In FIG. 3, as mentioned above, a third side view of the first design variant of the cellular telephone integration system 1 is depicted, whereby the clip 9 is in the overload position C9, to which the clip 9 is brought when the clip 9 is inadvertently moved in the direction of rotation w' from the release position B9. The overload position C9 is also used as a cleaning and maintenance position. The cellular telephone 7 has a measured thickness D7 between the display 7a and the rear side 7b and a measured length L7 between an upper side panel 7c and a lower side panel 7d.

Figure 4:
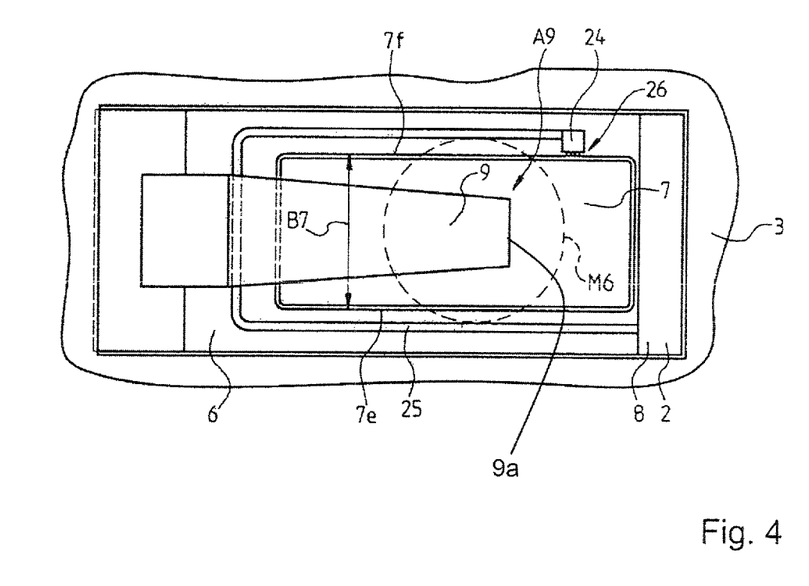
FIG. 4 is a plan view of the first embodiment, whereby the clip is in the clamping position.

In FIG. 4, as mentioned above, a plan view of the portrayal in FIG. 1 is depicted, whereby the clip 9 is in the clamping position A9 and the cellular telephone 7 is pressing on the seating 6. The cellular telephone 7 has a measured width B7 between a left side panel 7e and a right side panel 7f. The seating 6 is dimensioned such that cellular telephones with different length and breadth measurements can be placed on this. Different thicknesses of different cellular telephones are accommodated by different clamping positions of the clip 9. The manner in which the free end 9a of the clip 9 or the fixing element 11 of the clip 9 projects into a central area M6 of the seating 6 can be seen in the plan view.

Figure 5:
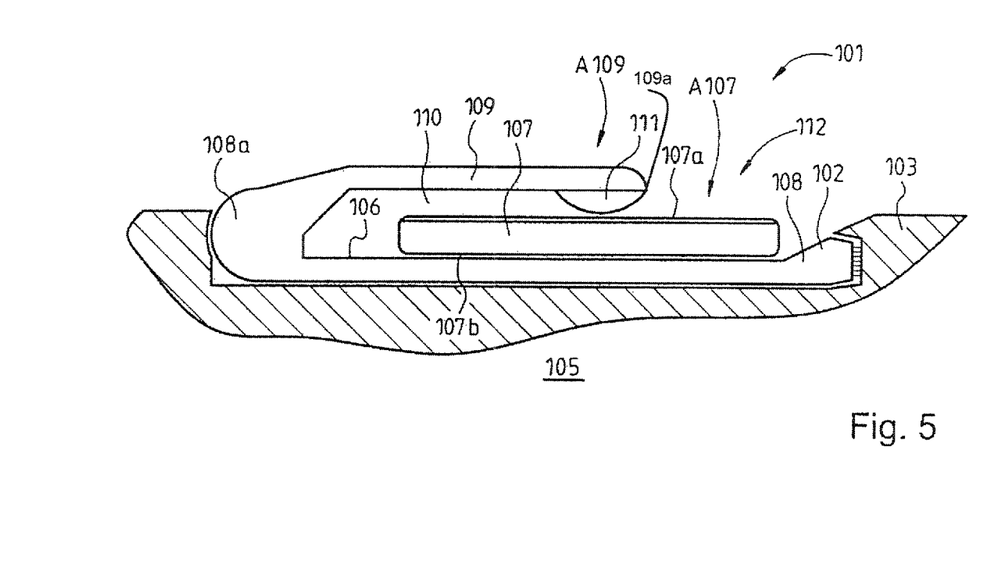
FIG. 5 is a partially cutaway side view of a second embodiment of a cellular telephone integration system according to the present invention, in which a clip is arranged, rotationally fixed to a base body of an adapter.

A partially cutaway side view of a second embodiment of a cellular telephone integration system 101 according to the invention is depicted in FIG. 5. The cellular telephone integration system 101 comprises an adapter 102 and a mounting device 103, whereby the mounting device 103 (not depicted) is accommodated in a console of a vehicle 105. The mounting device 103 is depicted as a cutaway in order to be able to depict a side view of the adapter 102. The adapter 102 incorporates a seating 106, on which a cellular telephone 107 is placed. The cellular telephone 107 is depicted with its display 107a uppermost and with its rear side 107b, located opposite the display 107a, in contact with the seating 106. The adapter 102 is detachably secured to the mounting device 103 and can be detached from the mounting device 103. The adapter 102 incorporates a base body 108 and a clip 109, which projects over the seating 106, from one edge 108a of the base body 108 in the clamping position A109 depicted in FIG. 5, with a fixing element 111, under pretension in the direction of the seating 106, into a receiving compartment 110 for the cellular telephone 107. In contrast to the first embodiment depicted in FIGS. 1 to 4, in the second embodiment, the clip 109 is arranged, rotationally fixed on the base body 108 of an adapter 102. Here, the cellular telephone 107 can be inserted into the receiving compartment 110 between a free end 109a of the clip 109 and the seating 106 in the clamping position depicted A107 through an access 112. In this clamping position A107, in which the cellular telephone 107 is positioned with its rear side 107b on the seating 106 of the adapter 102, the cellular telephone 107 is secured between the clip 109 and the seating 106 by the clip 109 pressing on the display 107a of the cellular telephone 107 with the fixing element 111. This clip 109 holds the cellular telephone 107 firmly in position in the adapter 102 in the clamping position depicted A107, even while the vehicle 5 is in operation.

Figure 6:
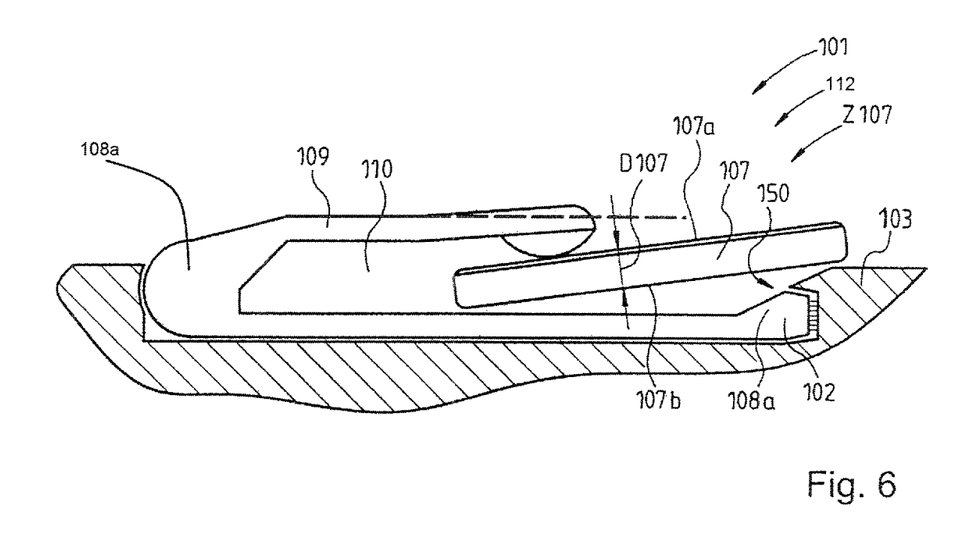
FIGS. 6 and 7 are two further side views of the second embodiment.

FIG. 6 depicts how the cellular telephone 107 can be removed from the clamping position A107 via an intermediate position Z107 by means of the elastic deformation or deflection of the clip 109 away from the receiving compartment 110 of the adapter 102. For this purpose, the cellular telephone 107 is drawn from the receiving compartment 110 via the access 112 where its rear side 107b is first positioned on the edge 108b of the base body 108 of the adapter 102 and is then positioned on the mounting device 103. In order to facilitate the removal of the cellular telephone 107 from the receiving compartment 110 or its insertion into the receiving compartment 110, the edge 108b of the base body 108 and the mounting device 103 are designed as a ramp 150 in the area of the access 112. By this means, the deformation of the clip 109 is minimized in the intermediate position 7107 and hence, the maximum pressure on the display 107a is also reduced.

Figure 7:
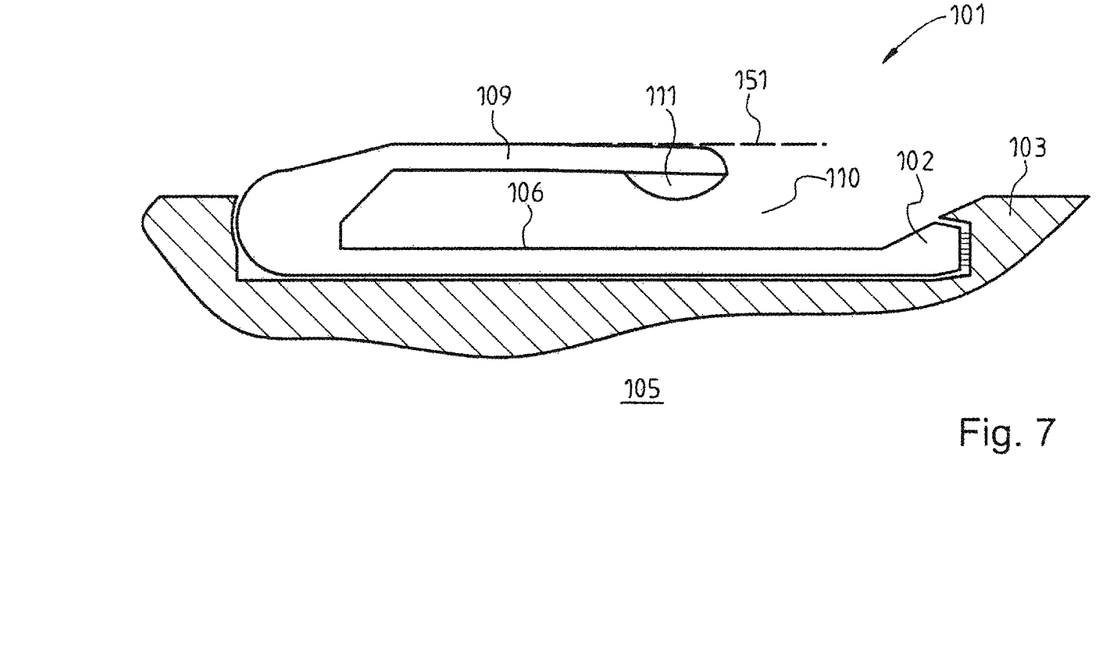

In FIG. 7, the adapter 102 is depicted with an empty receiving compartment 110. In this view depicting the position of the clip 109 where the cellular telephone has been inserted, by comparison with a guide line 151, it can be seen that, when the receiving compartment 110 is empty, the clip 109 has a pretension or deformation in the direction of the seating 106 in order to be able to secure an inserted cellular telephone with an adequate pressure. The invention allows various fixing elements 111 to be used for all three embodiments in order to be able to admit the respective cellular telephone to be held into the clamping position A107 with an adequate pressure, regardless of its thickness D107. For this purpose, the invention allows exchangable fixing elements to be designed.

Figure 8:
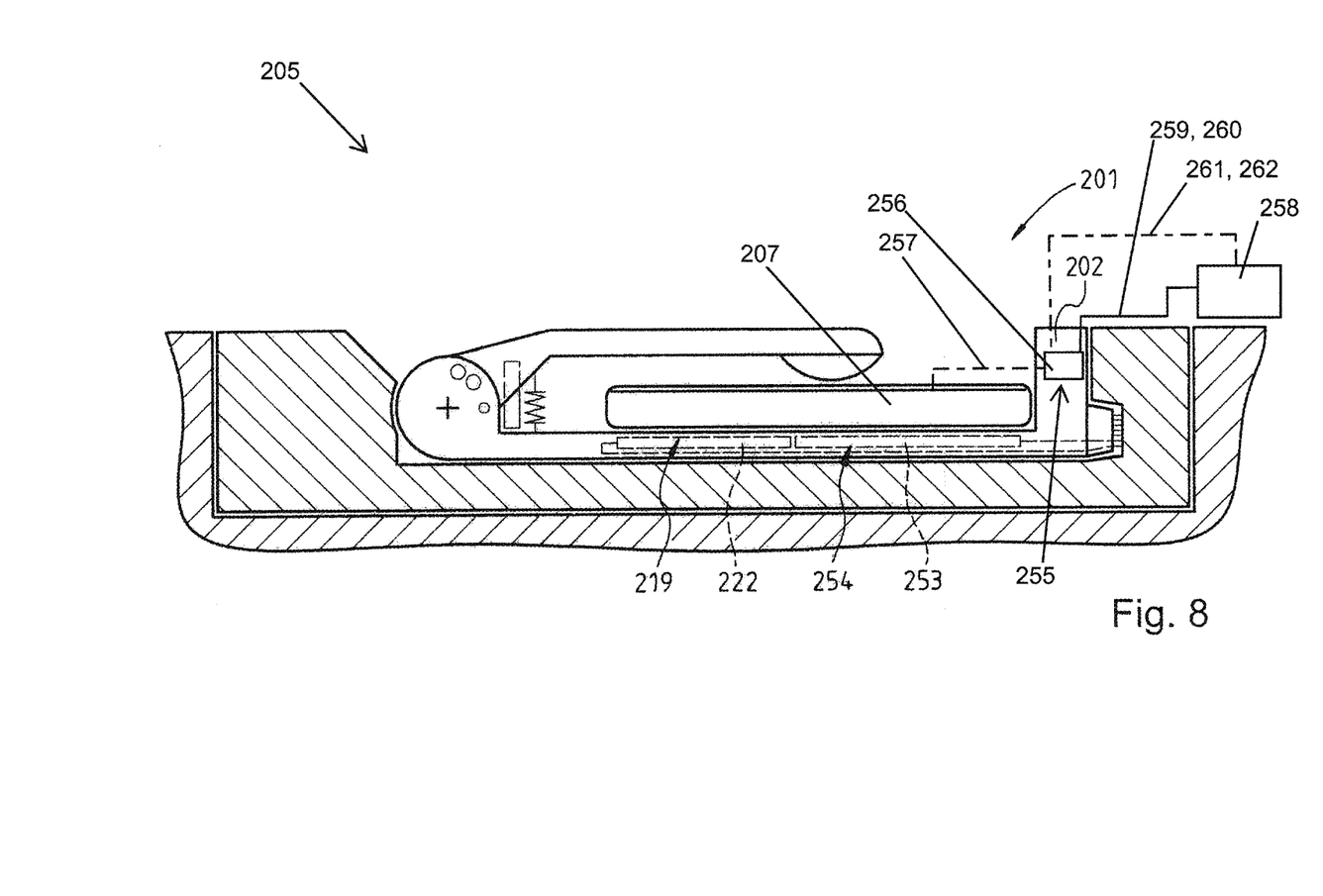
FIG. 8 is a partially cutaway side view of a third embodiment of a cellular telephone integration system according to the invention, in which a clip is in a clamping position.

In FIG. 8, a partly cutaway side view of a third embodiment of a cellular telephone integration system 201 according to the present invention is depicted. In terms of the overall mechanical structure, reference is made here to the description for the first embodiment. In contrast to this, an adapter 202 is not equipped with only one inductive loading unit 222 as the first interface 219, but also equipped with a coupler antenna 253 as a second interface 254. One embodiment incorporates the adapter 202 depicted in FIG. 8 in accordance with the schematic depiction as a third interface 255 as well an additional data communication device 256 via which a wireless data communication connection 257 can be made to a cellular telephone 207. This preferably has a transfer rate of at least 56 Mbps. In addition, the data communication device 256 is in data communication connection with the electronics 258 of the vehicle 205. Here, the data communication with the electronics 258 of the vehicle 205 takes place optionally via a wire-connected data communication connection 259 or via a wireless data communication connection 261. Here, the data communication connection 259 is made via a cable connection 260. Here, the wireless data communication connection 261 is made via a radio link 262. The wireless data communication connection 261 preferably has a transfer rate of at least 56 Mbps.

Figure 9:
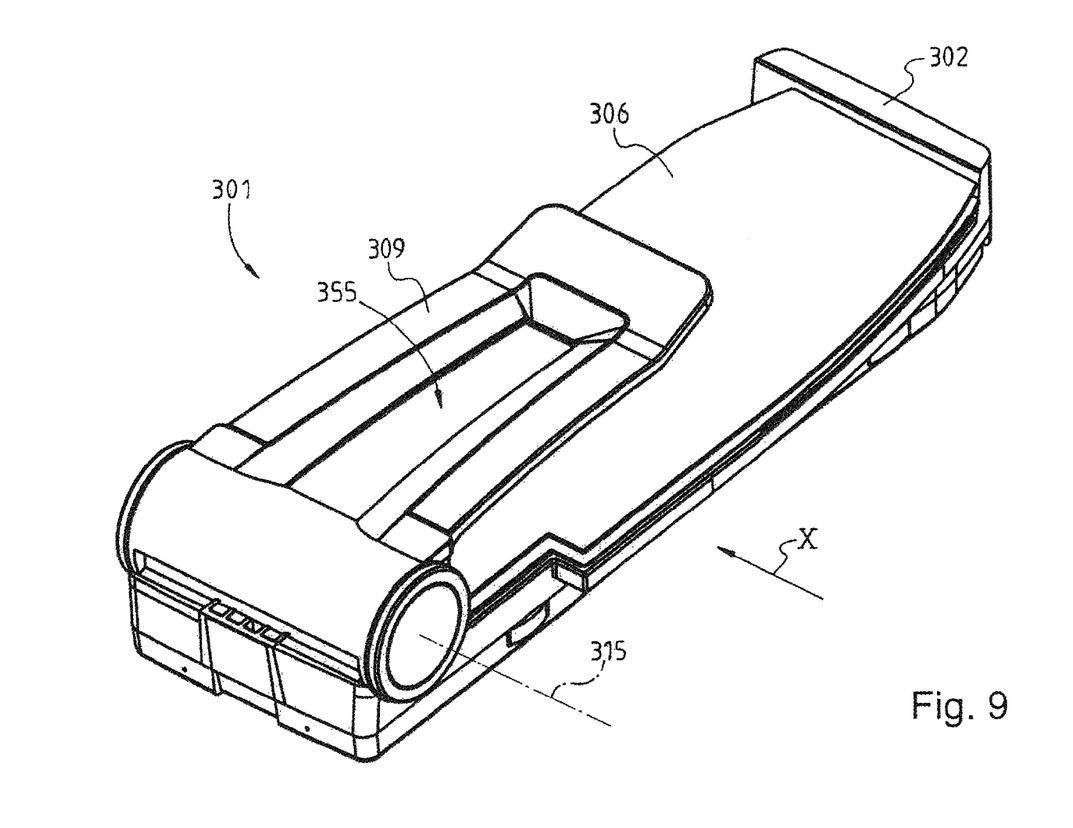
FIG. 9 is a perspective view and FIG. 10 is a side view of a fourth embodiment of a cellular telephone integration system according to the invention.

In FIG. 9, a perspective view of a fourth embodiment of a cellular telephone integration system 301 according to the invention is depicted. Only an adapter 302 for the cellular telephone integration system 301 is depicted, however. A mounting device and a console are not depicted. A clip 309, which can be pivoted around an axis of rotation 315 away from the seating 306 against a clamping device (not depicted) projects across a seating 306. The clip 309 is U-shaped and features an aperture 355, through which a cellular telephone placed in the adapter 302 would be visible.

Figure 10:
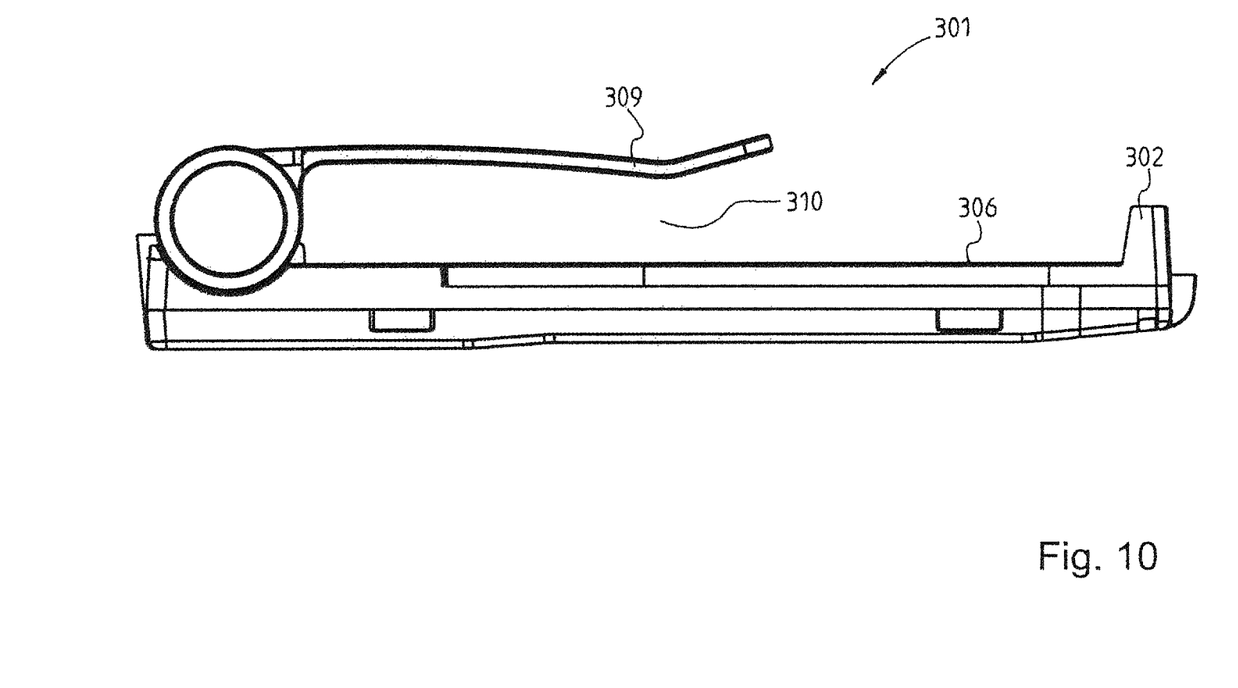

In the side view in FIG. 10, which depicts the adapter 302 from the direction of the arrow X, a receiving compartment 310 can be seen, which is formed between the clip 309 and the seating 306 for a cellular telephone (not depicted).

Figure 11:
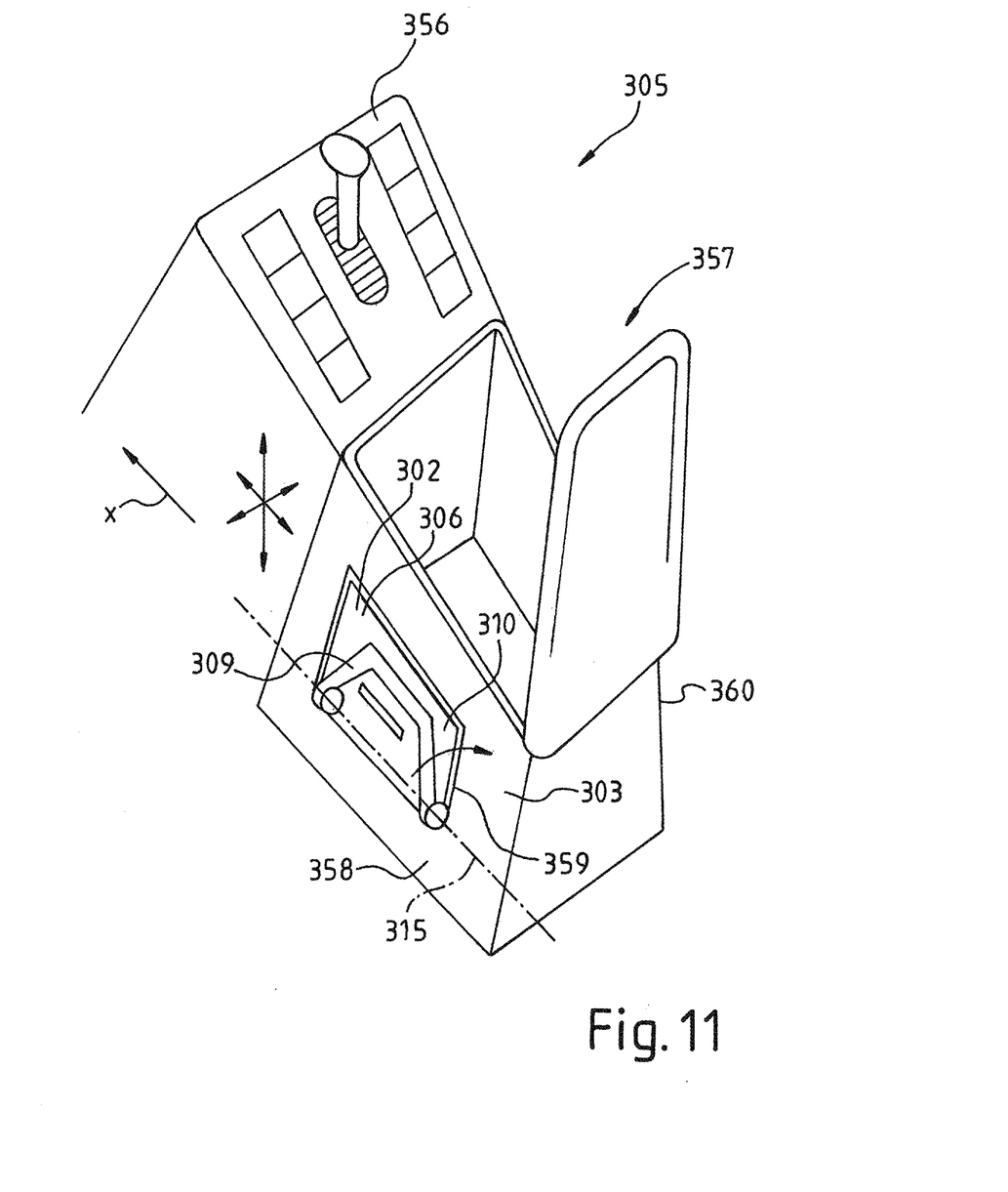
FIG. 11 is a perspective view of an arrangement of the fourth embodiment on a central console.

In FIG. 11, the adapter 302 depicted in FIGS. 9 and 10 are again portrayed schematically in a particular mounting position. In order to clarify the installation circumstances, FIG. 11 depicts a perspective view of the central console 356 of a vehicle 305, whereby the central console 356 incorporates a storage compartment 357 with a sidewall 358. The sidewall 358 forms a mounting device 303 for the adapter 302, whereby this incorporates a recess 359 for this purpose, into which the schematically represented adapter 302 is latched, such that in terms of the incorporation of the adapter 302 installation circumstances arise which are comparable with the installation circumstances depicted in FIG. 7. Here, the adapter 302 in the installation circumstances depicted in FIG. 11 in respect of a vehicle 305 is oriented such that the axis of rotation 315 of the clip 309 of the adapter 302 is aligned with the direction of travel x of the vehicle 305 with a deviation of a maximum of 30°, whereby the cellular telephone (not depicted) inserted in the receiving compartment 310 is drawn by the force of gravity in the direction of the axis of rotation 315 of the clip 309. By this means, the cellular telephone can be securely positioned in an area between the driver's seat and the central console which is comfortably accessible by the driver. The invention also allows a further adapter to be arranged on the opposite side of the shell 360 for a cellular telephone for the front-seat passenger, such that the cellular telephone integration system incorporates two adapters and two mounting devices.

The invention also enables the first interface to be designed as a coupler antenna and for a wireless or wire-connected energy supply for the cellular telephone to be dispensed with.

The invention is not limited to the embodiments depicted or described. Rather, it incorporates further embodiments of the invention within the context of the claims.

LIST OF REFERENCE SYMBOLS

1 Cellular telephone integration system
2 Adapter
3 Mounting device
4 Console of 5
5 Vehicle
6 Seating of 2
7 Cellular telephone
7a Display of 7
7b Rear side of 7
7c Upper side panel of 7
7d Lower side panel of 7
7e Left side panel of 7
7f Right side panel of 7
8 Base body
8a Edge of 8
9 Clip
9a Free end of 9
10 Receiving compartment of 2
11 Fixing element of 9
12 Access to 10
13 Clamping device
13a Spring
14 Damping device
14a Foam pad
15 Axis of rotation of 9 to 8
16 Stop of 9
17, 18 Stop recess for 16
19, 20 First interface
21 Wireless charger interface
22 Inductive loading unit
23 Wire-connected charger interface
24 Connector for 25
25 Charger lead
26 Socket on 7
27 Electric plug connection between 2 and 3
101 Cellular telephone integration system
102 Adapter
103 Mounting device
105 Vehicle
106 Seating of 102
107 Cellular telephone
107a Display of 107
107b Rear side of 107
108 Base body of 102
108a Edge of 108
108b Edge of 108
109 Clip
109a Free end of 109
110 Receiving compartment for 102
111 Fixing element of 109
112 Access to 110
201 Cellular telephone integration system
202 Adapter
205 Vehicle
207 Cellular telephone
219 First interface
222 Inductive loading unit
253 Coupler antenna
254 Second interface
255 Third interface
256 Data communication device
257 Data communication connection
258 Electronics of 205
259 Data communication connection
260 Cable connection
261 Data communication connection
262 Radio link
301 Cellular telephone integration system
302 Adapter 303 Mounting device
305 Vehicle
306 Seating
309 Clip
310 Receiving compartment
315 Axis of rotation
355 Aperture
356 Central console
357 Storage compartment
358 Shell of 357
359 Recess
360 Far side of shell of 357
A7 Clamping position of 7
A107 Clamping position of 107
A9 Clamping position of 9
A109 Clamping position of 109
B9 Release position of 9
C9 Overload position of 9
L7 Length of 7
M6 Central area of 6
w, w' Direction of rotation of 9 around 15
x Direction of travel of 305
Z107 Intermediate position of 107
B7 Width of 7
L7 Length of 7
D7 Thickness of 7
D107 Thickness of 107

The invention claimed is:

1. A cellular telephone integration system comprising an adapter and a mounting device,
   whereby the adapter incorporates a seating,
   whereby a cellular telephone can be placed on the seating,
   whereby the mounting device is affixed to a vehicle,
   whereby the adapter is attached detachably to the mounting device and incorporates a base body, and
   whereby the adapter incorporates at least one interface with the cellular telephone,
   wherein the adapter incorporates a clip, which projects from one edge of the base body in a clamping position under pretension in the direction of the seating, positioned over the seating such that a cellular telephone can be inserted between a free end of the clip and the seating in a clamping position,
   wherein the cellular telephone is secured in the clamping position between the clip and the seating by the clip pressing on the cellular telephone such that the cellular telephone is held firmly in position in the clamping position, even while the vehicle is in operation,
   wherein the clip is arranged one of rotationally fixed to the base body with the pretension of the clip created by an elastic deformation of the clip, and rotatable around an axis of rotation arranged on the base body with the adapter incorporating a clamping device, which is arranged between the base body of the adapter and the clip and which creates the pretension, and
   wherein the axis of rotation of the clip is aligned with the direction of travel of the vehicle with a deviation of a maximum of 30°, whereby the cellular telephone inserted in the receiving compartment is drawn in the direction of the axis of rotation of the clip by gravitational force.

2. A cellular telephone integration system in accordance with claim 1, wherein a first interface of the adapter is a charger interface, whereby the charger interface is one of a wireless charger interface, via which electric energy is transmitted wirelessly from an inductive loading unit of the adapter to a receiver coil of the cellular telephone, and a wire-connected charger interface, which incorporates a charger lead equipped with a connector, which is led out of the adapter such that different connector positions can be reached using the connector.

3. A cellular telephone integration system in accordance with claim 1, wherein a second interface of the adapter is an antenna connection interface, via which antenna signals of a coupler antenna of the adapter are received from the cellular telephone and are transmitted to the cellular telephone.

4. A cellular telephone integration system in accordance with claim 1, wherein the clip can be pivoted from the clamping position around an axis of rotation to a release position, and wherein the clip is able to be rotated still further around the axis of rotation by overriding a force holding the clip in the release position in the opening direction.

5. A cellular telephone integration system in accordance with claim 1, wherein the adapter incorporates a damping device, which acts against the clamping force of the clamping device when the clip is moved from the release position to the clamping position such that the speed of the movement of the clip towards the clamping position is reduced.

6. A cellular telephone integration system in accordance with claim 1, wherein a second wire-connected connection interface is formed which incorporates an antenna cable equipped with a connector, which is led out of the adapter such that different connector positions can be reached using the connector.

7. A cellular telephone integration system in accordance with claim 1, wherein the base body incorporates an elastically deformable pad, which forms at least part of the seating.

8. A cellular telephone integration system in accordance with claim 1, wherein the adapter incorporates a wireless data communication device as a third interface, whereby a wireless data communication connection with the cellular telephone in the vehicle located in the adapter is provided via the data communication device, whereby the data communication device is connected to the electronics of the vehicle for further data communication.

9. A cellular telephone integration system in accordance with claim 8, wherein the data communication between the data communication device and the electronics of the vehicle is wire-connected, whereby a wire-connected data communication connection is made via a cable connection in compliance with the USB standard.

10. A cellular telephone integration system in accordance with claim 8, the data communication between the data communication device and the electronics of the vehicle is wirelessly connected via a radio link and wherein the wireless data communication connection is made in accordance with the so-called WiFi standard or in compliance with the IEEE 802.11 standard.

11. The cellular telephone integration system of claim 8, wherein the wireless data communication connection has a data rate of at least 56 Mbps.

12. A cellular telephone integration system comprising an adapter and a mounting device,
   whereby the adapter incorporates a seating,
   whereby a cellular telephone can be placed on the seating,
   whereby the mounting device is affixed to a vehicle,
   whereby the adapter is attached detachably to the mounting device and incorporates a base body, and
   whereby the adapter incorporates at least one interface with the cellular telephone,
   wherein the adapter incorporates a clip, which projects from one edge of the base body in a clamping position under pretension in the direction of the seating, positioned over the seating such that a cellular telephone can be inserted between a free end of the clip and the seating in a clamping position, wherein the cellular telephone is secured in the clamping position between the clip and the seating by the clip pressing on the cellular telephone such that the cellular telephone is held firmly in position in the clamping position, even while the vehicle is in operation, wherein the free end of the clip projects toward a central area of the seating, whereby the clip is in contact with the cellular telephone positioned on the seating at one of a point, along a line, and over an area, and wherein the axis of rotation of the clip is aligned with the direction of travel of the vehicle with a deviation of a maximum of 30°, whereby the cellular telephone inserted in the receiving compartment is drawn in the direction of the axis of rotation of the clip by gravitational force.

\* \* \* \* \*